March 7, 1961 H. W. STRAAT 2,973,685
REFRACTOMETER
Filed June 26, 1957
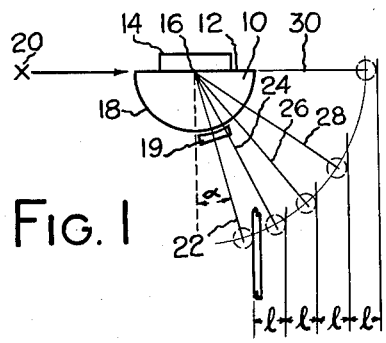
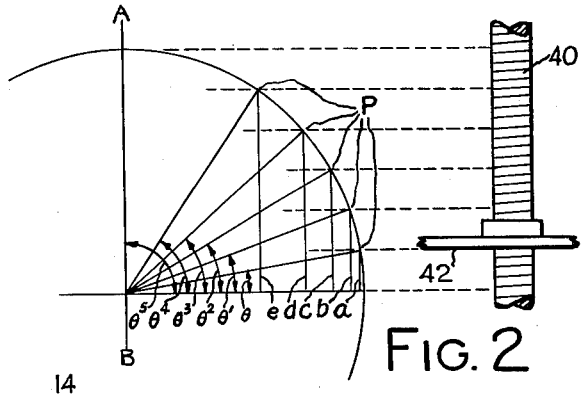
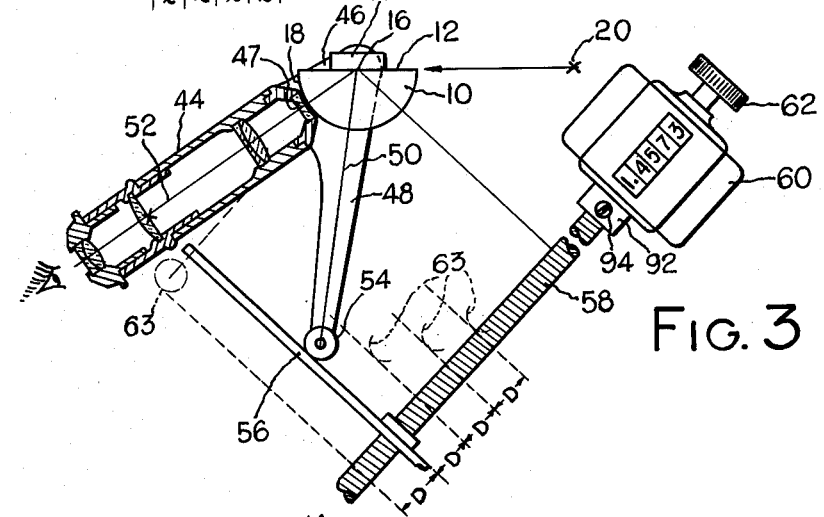
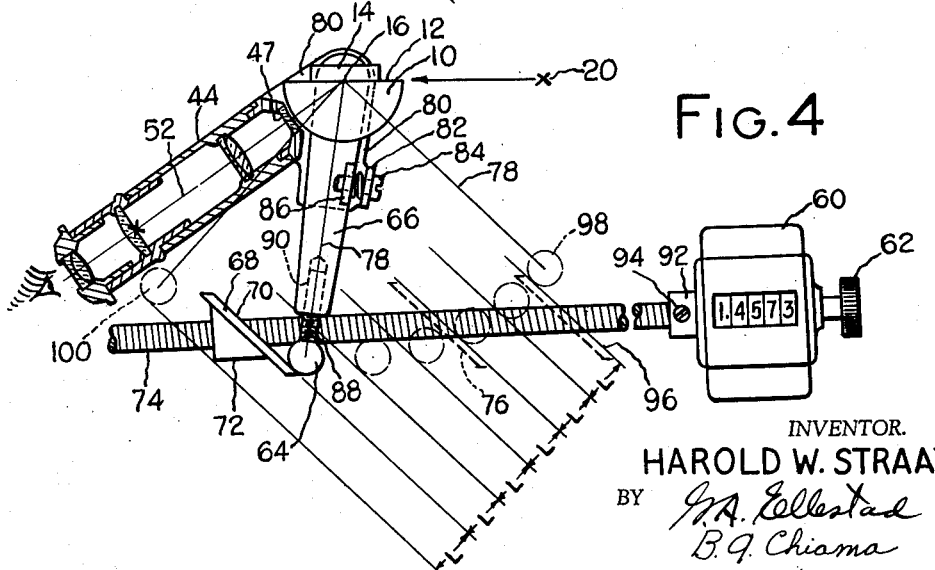
INVENTOR.
HAROLD W. STRAAT
BY
*ATTORNEYS*

United States Patent Office 2,973,685
Patented Mar. 7, 1961

2,973,685
REFRACTOMETER

Harold W. Straat, Irondequoit, N.Y., assignor to Bausch & Lomb Optical Company, Rochester, N.Y., a corporation of New York Filed June 26, 1957, Ser. No. 668,094

7 Claims. (Cl. 88—14)

This invention relates to refractometers and more particularly it relates to improvements in the indicating mechanisms therefor.

Conventional refractometers normally employ a rigidly held refracting prism and a telescope pivotally mounted about a center located in such a way as to allow the telescope to view total reflection within the prism caused by the presence of the material under study. Light rays entering the prism from an illuminator are caused to bend into the prism and are again refracted or bent upon emergence therefrom before entering the telescope and upon each of these bending or refracting stages the light rays are related to each other by a sinusoidal function. Consequently, a non-linear scale must be devised in order to compensate for this double effect of a sinusoidal function. The disadvantages of this system are, first, the rather cumbersome mathematical procedure necessary to produce such a scale which at most is the result of a complex mathematical relationship and, second, the need to carefully read the scale indicia against the telescope positioning indicator in order to obtain an accurate reading of the index of refraction of the material under study.

In order to obviate this difficulty somewhat, there have been introduced refractometers which utilize a hemispherical or a semi-cylindrical prism in combination with a compensating negative exit lens or any other appropriate compensating lens and a telescope adapted to be pivoted about the center of curvature of the prism. Since the exit surface is curved and compensated, the light rays corresponding with different indices are affected then only by one sinusoidal function. In the use of this known type of refractometer, a sinusoidal engraved scale is employed in order to compensate for the single sinusoidal relationship present in the light transmission system. As is common with engraved sine scales, the above-described scale is characterized by two disadvantages: first, at one end of the scale, the scale markings are bunched together and, second, the variable character of the scale eliminates the possible adoption of a vernier scale to be read in conjunction with the main scale. Similar refractometers of this type employ angular scales which may include a vernier scale, however, index values must be obtained from charts.

Because of the difficulties outlined above with regard to the effect of the bending of light rays entering and emerging from a refracting prism, there has been no provision in the present day refractometer for a direct reading linear scale which is adapted to facilitate easy and accurate indications of the index of refraction of materials under study. A number of so-called linear refractometers utilize the so-called flat portions of the sine curve for measurement purposes which portions are not truly linear. The linearity is increased, that is, error is reduced, by working within extremely narrow limits of index and if error is of secondary importance, the range may be increased somewhat. The apparatus would be designed as a result of the balance of compromises, that is, the range of indices to be measured is balanced against the permissible errors. In any event, since these refractometers are based upon approximated linear calibrations, their value as accurate instruments is seriously limited, especially over a wide range of indices. Therefore, it is the principal object of the present invention to provide a refractometer embodying a linear, direct reading scale having a comparatively high degree of accuracy over a relatively wide range of indices. In fact, the present invention is based upon linearity which is mathematically correct, that is, free of error and there is practically no limit to the accuracy of the index which may be measured. The range of measurable indices extends between the index of a vacuum and the index of the refracting prism itself and the only limitation in the refractometer of the present invention is the accuracy of the mechanical structure and the resolution of the telescope.

The present invention is readily adapted to include adjusting mechanisms for permitting easy conversion of the apparatus from one light source of a particular wavelength to another source of another wavelength without the need of calibrating and making new scales. As a corollary, the prism may be replaced by one having a different index, the replacement requiring simple manipulations of the same adjusting mechanisms.

Another object of the present invention is to provide an improved refractometer having structure suitably adapted for a counter for indicating the indices directly.

Another object of the invention is to provide a refractometer of simple construction and operation which may not only be economically manufactured but which will be efficient in use, require no adjustments for indication except for the knob of a counter mechanism, and be unlikely to get out of repair.

Another object is to provide a refractometer which may be adjusted to read the index of refraction for any wavelength of light and without previous knowledge of the index of refraction of the refractometer prism for this wavelength.

These and other objects and advantages reside in certain novel features of construction, arrangement and combination of parts as will hereinafter be more fully described, pointed out in the appended claims and will appear when taken in conjunction with the drawing wherein:

Fig. 1 is a side elevational view of the prism utilized in the present invention, showing the bending of light rays entering and emerging from the prism for various materials index study;

Fig. 2 is a schematic diagram of a unit circle showing various trigonometric relationships associated therewith;

Fig. 3 is a schematic diagram of the optical system and index scale for the present invention; and Fig. 4 is a view similar to Fig. 3 but showing a modification of a motion transmitting mechanism for the scale.

Referring now to Fig. 1 of the drawing, the invention will be described in terms of a summary of the effect of light rays through a refracting prism comprising a hemispherical or semi-cylindrical element 10. The prism 10 has a horizontal top surface 12 for receiving samples of materials under study such as the mating sample block 14 carried by the prism 10 and contacting surface 12 by means of a suitable contact liquid. In the event a liquid sample is to be tested, a semi-cylindrical or hemispherical prism having the same dimensions as the prism 10 may be placed upon the surface 12 with the liquid sample between the flat surfaces of the two prisms. The center 16 of the curved outer surface 18 of the prism 10 is located in coincidence with the plane of the surface 12 midway between the ends thereof. As is customary with the use of semi-cylindrical or hemispherical prisms, a negative compensating lens 19 is provided. A light source 20 is adapted to send light rays as indicated by the arrow between the adjacent mating surfaces of the prism 10 and the block 14.

For purposes of illustration, five emergent light rays are shown, namely, 22, 24, 26, 28 and 30, each of which is indicative of a refracted light ray for a different sample of material under study. Assuming that the index of refraction of the prism is 1.70, the ray 22 indicates an index of 1.30, they ray 24 indicates an index of 1.40, the ray 26 indicates an index of 1.50, the ray 28 indicates an index of 1.60 and the ray 30 indicates an index of 1.70. It will be noted that the angles between the light rays increase as the index increases by multiples of .10 which phenomenon is caused by the sinusoidal function inherent in refraction, that is, in satisfying the equation of Snell's law at the angle of grazing incidence:

$$n = N \sin \alpha$$

where:

$n$ is the index of refraction of the material under study
$N$ is the index of refraction of the hemispherical prism and
$\alpha$ is the angle between the exit light ray and the normal The incremental increase of the index of refraction of the material under study will result in a sinusoidal increase in the angle $\alpha$.

In the use of hemispherical or cylindrical prisms such as the prism 10 shown in Fig. 1, it is customary to include a telescope, pivotal about the center 16, for sighting along the emerging light rays. In order to read the respective index of refraction, it is necessary to swing the telescope relative to the prism 10 to bring the axis 52 of the telescope into alignment with the critical emerging light ray. Heretofore a sinusoidal scale has generally been used to measure the index of refraction in terms of the movement of the telescope.

The present invention obviates the need for such a scale and is designed with a linear scale based upon a conversion mechanism which is adapted to apply a sinusoidal movement to the sighting telescope in accordance with the sinusoidal character of the emergent light rays, where the movement of the telescope is produced by a linear motion generating device.

In order to understand the operation involved in the conversion mechanism, it will be well to understand some basic rules of trigonometry as applied to a unit circle. In Fig. 2 there is shown a unit circle having a unit radius such that the sine for any angle between two radial lines is represented by the distance between a point on the circle at which one of the lines terminates and the closest point on the other radial line. From this it will be seen that the length of the line $a$ is a measure of the sine of the angle $\theta$. In the illustration, line $b$ is twice as long as line $a$ and consequently the sine of angle $\theta'$ is twice that of angle $\theta$. Similarly, line $c$ is three times the length of line $a$, line $d$ is four times the length of line $a$, line $e$ is five times the length of line $a$, and line $f$ is six times the length of line $a$. While the corresponding sine values of the angles $\theta'$, $\theta^2$, $\theta^3$, $\theta^4$, $\theta^5$ are multiples of the sine value of angle $\theta$, the values of the angles themselves are not multiples since there is involved a sinusoidal relationship. Generally, in discussing sine waves, the angles are made multiples of a certain base angle and the opposite side is made to vary sinusoidally, however in the present discussion, the opposite approach is used whereby the opposite sides are made multiples of a certain side and the angles are made to vary. This is best illustrated by observing the arcs between the points P on the circle of Fig. 2. As the radial lines approach the vertical, the arcs and consequently the angles vary in accordance with the sine functions involved.

It will be seen that equal incremental movements of the plate 42 along the screw 40 correspond to the differences between the lengths of the various sine measuring lines $a$ through $e$. Therefore, the angles $\theta$ through $\theta^5$ bear a sinusoidal relationship to the corresponding equal incremental movements of the plate 42.

With these mathematical considerations in mind, it will be seen that the successive pivoting of a telescope about the center point 16 of the prism 10 so that the axis of the telescope would be in successive alignment with the illustrated light rays, the telescope would have been rotated sinusoidally, as corresponding to the points P on the circle illustrated in Fig. 2. However, the telescope, in pivoting in such manner, would displace multiples of a given distance upon the diameter of the prism of Fig. 1, these equal distances shown as incremental distances $l$. Therefore, with a suitable connection between the telescope and the plate 42 translational movement of the plate 42 in response to rotation of the screw 40 will rotate the telescope around the prism, and the angular travel of the telescope will be a sine function of the travel of the plate 42. By the present invention means are provided for pivoting a telescope about the center point 16, with the rotation of the telescope being a sine function of the movement of the drive member such as the screw 40 or the plate 42.

In Fig. 3 the prism 10 is shown in conjunction with a telescope 44 supported in a mounting 46 which is made pivotal about the center point 16 by any suitable means. A compensating negative lens 47 is mounted in the telescope adjacent the surface 18 and is movable with the telescope about the point 16. An arm 48 is also secured to the mounting 46 and carries a roller 54 which rides against a plate 56 which is movable linearly by rotation of a drive screw 58 threadedly received by the plate 56. The screw 58 and the plate 56 correspond to the screw 40 and the plate 42 shown in Fig. 2, and incremental movements of the plate 56 for the equal distances D will correspond to the incremental distances $l$.

A counter 60 is connected to the drive screw 58 for indicating the number of turns or fractions of a turn experienced by the screw 58. A handle or knob 62 is secured to one end of the drive screw 58 for rotating it. The counter 60 is preferably of the type which will count in unit degrees of rotation of the screw and if extreme accuracy is desired, the counter may be arranged to count in unit minutes or even seconds of screw rotation. Since the rotation of the screw is proportional to the index of refraction, the scale reading of the counter may be calibrated to read index of refraction directly.

The arm 48 may be of any convenient length; however, the length must be considered when calibrating the counter 60. The axis of the arm 48 may be at any angle with respect to the telescope axis 52 and, for that matter, it may be located in coincidence with the telescope axis 52. In this latter arrangement, the arm can be dispensed with and the roller 54 may be rotatably attached directly to the telescope. As shown in Fig. 3, the roller 54 may assume different positions, as indicated by the numeral 63, as the plate 56 is moved along the screw 58 for various positionings of the telescope. Movement of the plate 56 along the screw at a regular rate is effective to rotate the arm 48 and the telescope 44 at a sinusoidal rate.

In operation, material to be tested is applied to the surface 12 in the usual manner and the observer will sight through the telescope in order to align a suitable crosshair formed therein with the reflection or dividing line of the refracted ray which is peculiar to that material. This is accomplished by rotating the knob 62 until the axis of the telescope has become aligned with this line of reflection. After this procedure, the index of the material may be directly read from the counter 60.

In the embodiment of Fig. 4, the sinusoidal mechanism is essentially the same and differs therefrom by the use of a linearly driven inclined plane instead of the plate 56 and a rigidly secured ball 64 on the end of the arm 66 instead of a roller. The arm 66 is caused to rotate about the point 16 by an angled plate 68 having a surface 70 engageable with the ball 64. The plate 68 is secured to a nut 72 threadedly receiving a drive screw 74 and is movable linearly upon rotation of the screw, as shown by the dotted position 76 of the plate 68. It will be noted that the surface 70 is at an acute angle with respect to the axis of the screw 74, however, equal incremental advancements L of the nut 72, upon equal increments of rotation of the screw, will rotate the arm 66 sinusoidally, as was the case for the embodiment of Fig. 3. The advantages of the angled plate are twofold: firstly, the size of the plate 68 may be relatively short for a relatively wide sweep of the arm 66 and the telescope 44, and, secondly, because of the reduced size of this plate, the refractometer can be fabricated as a small, compact instrument. The embodiment of Fig. 3 would necessarily require a relatively long plate in order to permit rolling of the roller thereupon for the full swing of the arm 48.

The present invention includes means for permitting easy conversion of the apparatus from use with one light source of a particular wavelength to another source of another wavelength, or the replacement of the prism with one having a different index of refraction, and to this end there are provided adjustment mechanisms for adjusting the angle between the telescope 44 and the arm 66, and for adjusting the effective length of the arm 66. As shown in Fig. 4, the mounting 80 for the telescope 44 is formed with an upstanding flange 82 which rotatably retains a screw 84. A similar flange 86 is formed on the arm 66 and is provided with a tapped bore for threadedly receiving the screw 84. The arm and the telescope would rotate about the center point 16 independently of one another except for the connection between the flanges by the screw. This connection secures the arm to the telescope for movement therewith and permits angular adjustment therebetween by manipulation of the screw 84.

A threaded shank 88 is made integral with the ball 64 and is adapted to be adjustably retained in a suitably tapped opening 90 formed in the end of the arm 66. The effective length of the arm 66 may be varied by manual rotation of the ball with respect to the arm. As shown in Figs. 3 and 4, the driving shaft 92 of the counter 60 is provided with a set screw 94 and may be disconnected from the drive screws 58 or 74, as he case may be, for permitting setting of the counter for a predetermined index without rotating the screw.

In a calibration operation then, assuming that the apparatus has been previously adjusted for a monochromatic light source of a particular wavelength, the source 20 may be replaced by one having a different wavelength and the adjusting mechanisms, as previously described, may be adjusted to accommodate the new light source. A new light source of different wavelength is arranged in the apparatus and the screw 74 is rotated until the nut 72 is positioned in one of its extreme positions on the screw such that the surface 70 of the plate 68 is parallel with the axis 78 of the arm 66 (see position 96 of the plate 68 and position 98 of the ball 64). With the plate 68 and the ball 64 in these positions, the axis 52 of the telescope should be normal to the refracting surface 12 through the point 16. This will result when the angle between the axes 52 and 78 is equal to the complement of the angle between the surface 70 and the axis of the drive screw 74. For purposes of illustration, the angle between the axes 52 and 78 has been chosen as 45° and the angle betweet surface 70 and the axis of the drive screw is 45°. Any other suitable angular relationship may be chosen so long as the sum of the two angles is 90°. In the event that the axis of the telescope is not normal with the surface 12, as aforesaid, when the axis 78 of the arm 66 is parallel with the surface 70, the adjusting screw 84 is manipulated until such conditions are present in the apparatus.

With the axis of the telescope normal to the surface 12, the counter 60 should read 0.0000 and in the event such reading is not present, the locking screw 94 on the driving shaft 92 is unloosened and the counter adjusted until such reading is present. This step of the calibration procedure and the step of adjusting the angular relationship between the axes 52 and 78 actually only need be performed once, when the apparatus is initially calibrated since any change in the light source or replacement of the prism will not affect the relationship between the screw 74 and the counter and the angular relationship between the axes 52 and 78.

In the next step of the calibration procedure for a light source of any selected wavelength, the drive screw 74 is rotated with the aid of the knob 62, until the known index of refraction of the prism 10 for the selected light source is indicated by the counter 60. For this reading, the plate 68 will be somewhere near the opposit end of the drive screw as indicated by the dotted position 100, its actual position depending on the color of the light source and the dispersion characteristic of the prism 10. With the parts thus positioned, the effective length of the arm 66 is adjusted by turning the ball 64 until it is in engagement with the surface 70 when the axis 78 is normal therewith. The change in the effective length of the arm 66 will vary the rate of the sinusoidal rotational movement of the telescope in that incremental movement of the plate 68 will result in a greater or lesser movement of the telescope as the case may be.

Actually, the steps of the above-described calibration procedures involving the manipulation of the adjusting screws 94 and 84 may be performed during the assembly of the apparatus or for those situations where for some reason the mechanical linkages of the apparatus have become misaligned. Once these adjustments have been initially made, the refractometer may be easily and quickly adjusted for use with a light source of any desired color merely by turning the knob 62 until the index of refraction of a new light source in conjunction with the prism, or the index of refraction of a new prism using the original light source, is indicated by the counter and then adjusting the length of the arm 66 by turning the ball 64, as aforesaid.

The adjusting mechanisms have been described in connection with the embodiment of Fig. 4 for purposes of illustration only. It is to be understood that these mechanisms may be incorporated into the embodiment of Fig. 3, in which case the roller 54 would be made axially adjustable with respect to the arm 48 by a suitable screw means similar to the threaded shank 88. The mounting 46 for the telescope 44 and the arm 48 may be formed with flanges and an adjusting screw similar to that disclosed for the mounting 80 in the embodiment of Fig. 4.

Calibration of the refractometer to adjust it for use with different light sources, or when replacing prisms, may also be quickly and readily done by the use of a standard sample of known refractive index placed in optical contact with the surface 12 of the prism. If desired, air ($N_D = 1.0003$) may be used as a standard, but for maximum accuracy it is generally preferred to use a standard having an index relatively close to or within the working range.

For calibrating against a standard, the standard is placed in optical contact with the prism surface 12, and the screw 74 is turned until the counter 60 indicates the known refractive index of the standard. The ball 64 is then adjusted until the dividing line is centered on the telescope cross-hairs. This completes the calibration against the standard.

The arrangement provides an extremely simple calibration technique whereby the refractometer of the present invention may be readily and quickly converted for use with any desired light source, while still retaining its direct reading, linear characteristics. It is not necessary to consult conversion charts as is customarily required in the use of other refractometers, and only a single adjustment is required.

From the foregoing description, it will be appreciated that the present invention provides means for converting linear motion into sinusoidal motion and to apply this means in compensating opposition to the sinusoidal characteristic of refracted light rays so that the measurement of the linear motion is indicative of the indices of refraction. Adjusting mechanisms have been incorporated into the elements of the sinusoidal mechanism for permitting the application of any monochromatic light source of any particular wavelength as the refracting prism into the apparatus.

While there is in this application specifically described one form and a modification of a part thereof which the invention may assume in practice, it will be understood that this form is shown for purpose of illustration, and that the same may be modified and embodied in various other forms or employed in other uses without departing from the spirit or the scope of the appended claims.

I claim:

1. In a refractometer of the type including a refracting prism having a curved exit surface and a telescope movable relative to the prism and arranged for observing light emitted from the curved exit surface, the improvement comprising a sinusoidal drive mechanism connected between the telescope and the prism, said mechanism including a drive member, and a device including a scale having successive increments of equal size for measuring movement of said drive member, each scale increment corresponding to an equal movement of said drive member, and movement of the telescope being a sine function of movement of said drive member.

2. In a refractometer of the type including a refracting prism having a curved exit surface and a telescope movable relative to the prism and arranged for observing light emitted from the curved exit surface, the improvement comprising a sinusoidal drive mechanism connected between the telescope and the prism, said mechanism including a plane abutment surface movable in translation in a tangent direction relative to the prism exit surface, and a member fixed relative to the telescope and in slidable abutting engagement with said plane surface, the point of engagement between said member and said plane surface being at a fixed distance from said curved exit surface at all operative positions of said mechanism.

3. In a refractometer of the type including a refracting prism having a curved exit surface and a telescope movable relative to the prism and arranged for observing light emitted from the curved exit surface, the improvement comprising a sinusoidal drive mechanism connected between the telescope and the prism, said mechanism including a plane abutment surface movable in translation in a tangent direction relative to the prism exit surface, means including a uniform scale for measuring the movement of said plane surface, and a member fixed relative to the telescope and in slidable abutable engagement with said plane surface for movement therewith in said tangent direction, whereby movement of the telescope is a sine function of the movement of said plane surface.

4. In a refractometer of the type including a refracting prism having a curved exit surface and a telescope movable relative to the prism and arranged for observing light emitted from the curved exit surface, the improvement comprising a sinusoidal drive mechanism connected between the telescope and the prism, said mechanism including a first member having a plane abutment surface and movable in translation along a path parallel to a tangent of the prism exit surface, a screw for driving said first member in translation in response to rotation of said screw, and a second member fixed relative to the telescope and in slidable abutting engagement with said plane surface, whereby movement of the telescope is sinusoidally related to rotation of said screw.

5. In a refractometer of the type including a refracting prism having a curved exit surface and a telescope movable relative to the prism and arranged for observing light emitted from the curved exit surface, the improvement comprising a sinusoidal drive mechanism connected between the telescope and the prism, said mechanism including a first member having a plane abutment surface and movable in translation along a path parallel to a tangent of the prism exit surface, a screw for driving said first member in translation in response to rotation of said screw, a second member fixed relative to the telescope and in slidable abutting engagement with said plane surface, and indicating means for measuring the rotation of said screw.

6. In a refractometer of the type including a refracting prism having a curved exit surface and a telescope movable relative to the prism and arranged for observing light emitted from the curved exit surface, the improvement comprising a sinusoidal drive mechanism connected between the telescope and the prism, said mechanism including a plane abutment surface movable in translation in a direction tangent to the curvature of the prism exit surface, said plane surface being mounted at an acute angle to its direction of movement, and a member fixed relative to the telescope and in slidable abutting engagement with said plane surface, the point of engagement between said member and said plane surface being at a fixed distance from said curved exit surface at all operative positions of said mechanism.

7. In a refractometer of the type including a refracting prism having a curved exit surface and a telescope movable relative to the prism and arranged for observing light emitted from the curved exit surface, the improvement comprising a sinusoidal drive mechanism connected between the telescope and the prism, said mechanism including a plane abutment surface movable in translation in a tangent direction relative to the prism exit surface, a member fixed relative to the telescope and in slidable abutting engagement with said plane surface, the point of engagement between said member and said plane surface being at a fixed distance from said curved exit surface at all operative positions of said mechanism, and adjustment means for varying the effective length of said member as measured from the prism exit surface to the point of engagement with said plane surface.

References Cited in the file of this patent

UNITED STATES PATENTS 2,583,973     Stamm et al.              Jan. 29, 1952

OTHER REFERENCES

Badger et al.: "A Vacuum Spectograph for the Infra-Red," pp. 861–865, Review of Scientific Instruments, vol. 19, No. 12, December 1948. Page 862 relied upon.

Pfund: "A High Index Refractometer," pages 966–969, Journal of the Optical Society of America, vol. 39, No. 11, November 1949.

Bausch & Lomb Catalog D-202 entitled "Bausch & Lomb Refractometers," received in Div. 7, Jan. 13, 1950.

Fastie: "A Small Plane Grating Monochromator," pages 641–647, Journal of the Optical Society of America, vol. 42, No. 9, September 1952.